Oct. 31, 1933.  I. TUCKER  1,932,994
ELECTRICAL APPARATUS
Filed March 22, 1932
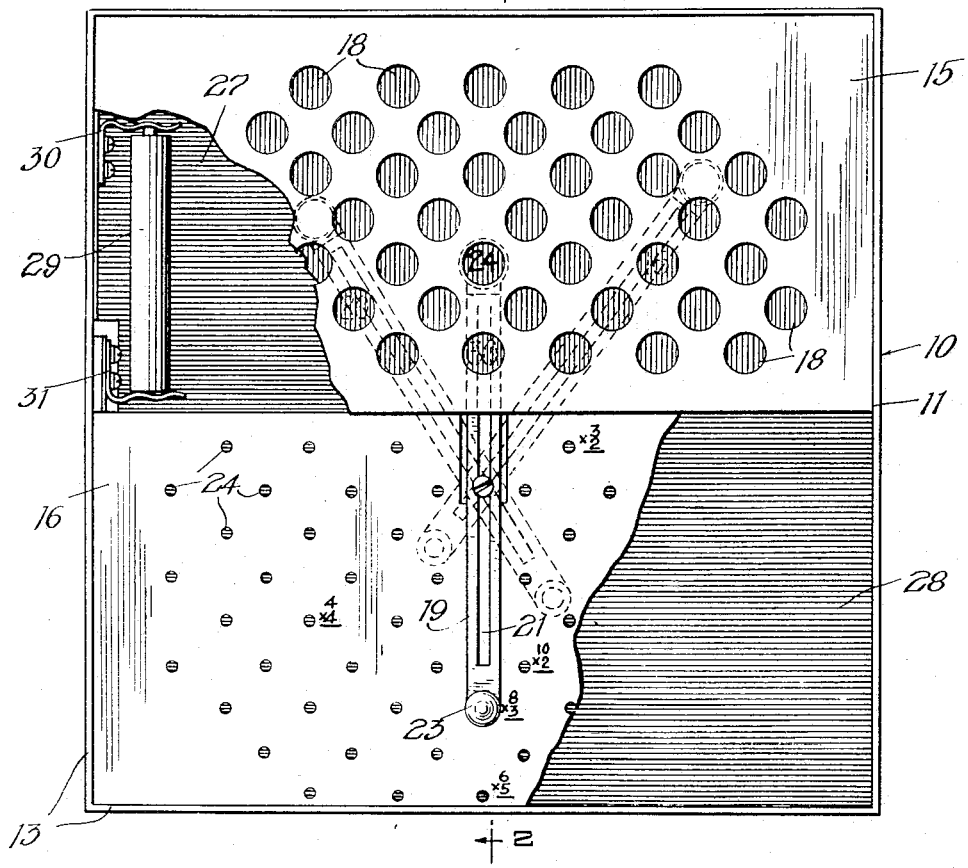
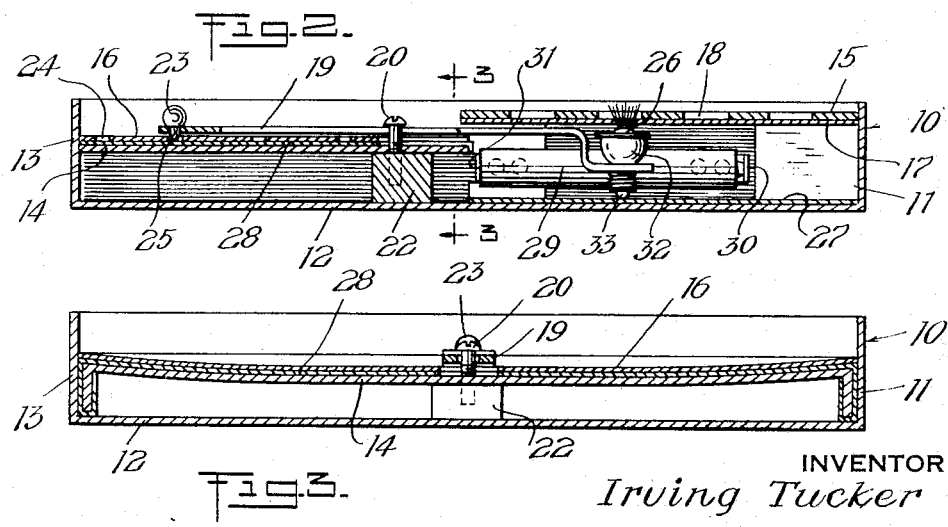
INVENTOR
*Irving Tucker*
BY HIS ATTORNEY
*George Schlatt*

Patented Oct. 31, 1933

1,932,994

UNITED STATES PATENT OFFICE 1,932,994

ELECTRICAL APPARATUS

Irving Tucker, White Plains, N. Y.

Application March 22, 1932. Serial No. 600,440

8 Claims. (Cl. 35—12)

This invention relates to an educational apparatus, and more particularly to the instructive game type.

Among the principal objects which the invention has in view are: To provide an improved type of educational apparatus adapted to function electrically; to provide an apparatus which will function without the employment of electrical wiring; to make a positive contact to give the answer to a question; to provide means whereby utilization of excessive parts may be eliminated in operation of the apparatus when in use; to secure simplicity of construction, operation and minimum cost of manufacture; and to obtain other advantages and results as may be brought out in the following description.

Drawing:

Figure 1 is a plan of the apparatus with certain parts broken away, and embodying by invention;

Figure 2 is a sectional view shown as taken on the line 2—2 of Figure 1; and

Figure 3 is a sectional view shown as taken on the line 3—3 of Figure 2.

Description:—In the specific embodiment of the invention, illustrated in the drawing, the reference numeral 10 indicates my improved educational apparatus or instructive game in general. It is to be noted that the invention is particularly directed to the education of small children, in the matter of giving them a preliminary education as to mathematics, history and so forth. The apparatus provides for exhibiting a number of questions on a sheet, the answers to which are normally invisible, but may be made to appear one at a time when desired. The means for obtaining the answers, and other essential features will be hereinafter described.

The apparatus preferably includes a box-like container 11 having a bottom wall 12 and upstanding edge walls 13. Within this box-like container are provided two platforms 14 and 15 which together substantially cover the area of the bottom wall and spaced therefrom toward the upper part of the container. One of these platforms, for instance 15, is higher than the other platform, thus placing them in different planes and consequently enabling the one to lap over the other to a desired extent. The lower of these two platforms 14, is arranged to receive a sheet 16 thereon having the questions or problems appearing at appropriately separated points, a few of the problems being exhibited in Figure 1 consisting of multiplicand and multiplier, the resultant product of which is the answer to be derived by the student or player and correctness of which is to be checked by utilization of the apparatus. The answers to these problems are preferably hidden from normal view, and to this end the same are printed or otherwise applied to sheets 17 placed on the underside of the higher platform 15. The platform 15 is shown with a plurality of holes or windows 18 arranged to correspond, as will hereinafter be described with the placement of the problems on the question sheet 16. The answers are rendered visible one at a time through the windows, and may therefore be reversely printed on the underside of answer sheet 17.

Means are provided for shining a light from beneath the answer sheet through the answer sheet and one of the windows to exhibit the answer to any one of the problems on the question sheet. To accomplish this purpose I provide a slidably pivoted arm 19, the pivoting of which is effected in the present instance by a screw 20 passing downwardly through a longitudinal slot 21 in the arm, through the lower platform 14 into a fixed block 22 carried by the bottom wall of the container 11. It will be observed that this arm may be swung and slid flatwise with respect both of the platforms and has a portion of itself overlying the platform 14 and question sheet 16, and has another portion projecting between the overlapping edges of the platform and underlying the upper platform 15 and answer sheet 17. The arm is long enough and the slot has a suitable length to enable the arm to be brought to any point on the question sheet, the exposed end of the arm having a knob or finger piece 23 for manipulating said arm. Juxtaposed to each problem on the question sheet is a hole 24 and beneath the arm and knob 23 is provided a point 25 which may enter any one of said holes of the question sheet. The holes in the question sheet and the windows in the platform 15 overlying the answer sheet are definitely related so that when the pointer at one end of the arm is positioned in one of the holes in the question sheet, the opposite end of the arm underlies one of the windows over the answer sheet. An electric light bulb 26 is provided at this latter end of the arm thus making the answer visible through the window.

In order to obtain proper electrical connection without having to flex any wires, nor have a plurality of connections, I have lined the inside surface of the bottom wall of the container which underlies the upper platform 15, with conductive material such as tin-foil 27. I likewise have surfaced the upper face of the lower platform 14, except adjacent the pivot 20, with conductive material 28 which also may be tin-foil. A battery 29 may be suitably mounted within the container, for instance under the upper platform 15 by means of spring clips 30, 31 carried by one of the upstanding sidewalls. These clips are connected, one to one of the tin-foil surfaces, and the other to the other tin-foil surface, each such tin-foil surface and its clip being insulated from the other tin-foil surface and its clip. Where the container is constructed of cardboard or insulative material, direct attachment of the clips thereto obtains the desired electrical separation. As here shown the tin-foil on the bottom wall of the container extends up the side wall at a proper position to underlie its clip 30. The tin-foil on the platform 14 is extended down the same side wall and under its clip 31.

The arm 19 is preferably metallic and point 25 depending therefrom and from knob 23 is also metallic so there will be an electrical connection established thereby with the tin-foil on the platform when said point 25 is positioned in holes 24 of the question sheet. The electric light bulb 26 is carried by a socket 32 such that the lower contact 33 of the bulb will ride upon the tin-foil on the bottom of the box and the side terminal or shell of the electric light bulb will be in electrical contact with said arm 19. Consequently, from one clip, such as 30, electrical circuit will be established through the tin-foil on the floor of the container to the end terminal of electric light, through the light to arm 19 and thence through point 25 to the tin-foil 28 on the platform 14, and thence to clip 31 thereby making a closed circuit with battery 29. When the point 25 of the arm 19 rests upon the question sheet and not projecting through one of the holes therein, the electric circuit is incomplete and therefore the electric light bulb is not illuminated. On the other hand, when the user desires to see an answer to a particular question the said point 25 is introduced into the hole adjacent that question whereupon the electric circuit is completed and the answer to that particular question will be observed by virtue of illumination of bulb 26 underlying the answer on the answer sheet and thus made visible through the window 18 provided therefor.

If so desired, the lower platform 14 may be made slightly concave with the pivot 20 at the lowest point thereof, as illustrated in Figure 3. The arm 19 is flexible and resilient and by virtue of this resiliency and the concave surface the terminal 33 on the bulb will be pressed at all times against the bottom wall of the container and point 25 at the other end of the arm will be pressed toward its underlying platform. The electric contact secured by point 25 and the bulb terminal 33 with the respective surfaces of conductive material will thereby be insured at all positions of the said arm whenever the contact point 25 registers with one of the holes 24.

The device is preferably so constructed that it is adapted to more extensive use than merely one set of questions and answers. The question sheet 16 may be slid from under the arm 19 and removed or replaced at will. Likewise, the answer sheet may also be removable and replaceable from under the upper platform 15.

Obviously detail changes and modifications may be made in the construction and use of my improved educational apparatus, and I do not wish to be understood as limiting myself except as set forth in the following claims when construed in the light of the prior art.

I claim:

1. An apparatus as characterized comprising a pair of electrically separated and conductive surfaces, an elongated slidably pivoted arm movable simultaneously with respect to both surfaces establishing contact at desired points on one surface and obtaining corresponding contact with the other surface, and an electric light bulb for obtaining an illumination at one end of said movable arm at predetermined points of contact effected by the other end of said movable arm with one of said conductive surfaces.

2. An apparatus as characterized comprising a pair of electrically separated and conductive surfaces, an elongated slidably pivoted arm movable simultaneously with respect to both surfaces establishing contact at desired points on one surface and obtaining corresponding contact with the other surface, and a perforate sheet, and an electric light bulb for obtaining an illumination at one end of said movable arm at predetermined points of contact effected by the other end of said movable arm through the perforations of said sheet with one of said conductive surfaces.

3. An apparatus as characterized comprising in combination with a question sheet having perforations adjacent the questions, a conductive surface beneath the question sheet, an elongated slidably pivoted arm having a point adapted to be inserted through any one of said perforations, and means functioning as a result of contact made through said perforations to exhibit an answer to the question appearing next to said perforation.

4. An apparatus as characterized comprising in combination with a question sheet having perforations adjacent the questions, a conductive surface beneath the question sheet, an elongated slidably pivoted arm having a point adapted to be inserted through any one of said perforations, an electric light bulb functioning as a result of contact made through said perforations to exhibit an answer to the question appearing next to said perforation.

5. An apparatus as characterized comprising in combination with a question sheet having perforations adjacent the questions, a conductive surface beneath the question sheet, an elongated slidably pivoted arm having one end extending over the question sheet and having a point adapted to project through any one perforation and make electrical contact with the conductive surface therebeneath, and an answer sheet overlying the other end of said arm, which said other end provides means for mounting an electric light bulb thereon whereby the bulb will be illuminated under the answer sheet at a point determined by the position of the arm and perforation selected for making contact.

6. An apparatus as characterized comprising in combination with a question sheet having perforations adjacent the questions, a conductive surface beneath the question sheet, an elongated slidably pivoted arm having one end extending over the question sheet and having a point adapted to project through any one perforation and make electrical contact with the conductive surface therebeneath, an answer sheet overlying the other end of said arm, which said other end provides means for mounting an electric light bulb thereon whereby the bulb will be illuminated under the answer sheet at a point determined by the position of the arm and perforation selected for making contact, and means overlying the answer sheet and having windows therein corresponding to each position of the bulb supporting end of the arm when the opposite end of the arm is making contact through a perforation.

7. An apparatus as characterized comprising in combination with a question sheet having perforations adjacent the questions, a conductive surface beneath the question sheet, an elongated slidably pivoted and longitudinally slotted arm having one end extending over the question sheet and having a point adapted to project through any one perforation and make electrical contact with the conductive surface therebeneath, and an answer sheet overlying the other end of said arm, which said other end provides means for mounting an electric light bulb thereon whereby the bulb will be illuminated under the answer sheet at a point determined by the position of the arm and perforation selected for making contact.

8. An apparatus as characterized comprising in combination with a concave question sheet having perforations adjacent the questions, a conductive surface beneath the question sheet, an elongated and slidably pivoted arm having one end extending over the question sheet and having a point adapted to project through any one perforation and resiliently pressed to make electrical contact with the conductive surface therebeneath, and an answer sheet overlying the other end of said arm, which said other end provides means for mounting an electric light bulb thereon whereby the bulb will be illuminated under the answer sheet at a point determined by the position of the arm and perforation selected for making contact.

IRVING TUCKER.